a compound containing a plurality of hydroxyl groups and having a molecular weight below about 200. These reagents are used in such relative amounts that the ratio of hydroxyl groups present in the low molecular weight polyhydroxy compound to triglyceride hydroxl groups is from 0.6:1 to 2.3:1, the ratio of the combined total number of hdroxyl groups present in the triglyceride and in the polyhydroxy compound to the number of isocyanate groups present in the arylene diisocyanate is from 0.65:2 to 1.1:2 and the amount of water used is at least approximately equivalent to the amount of unreacted isocyanate groups present in the said polyurethane product.

2,833,730

ARYLENE DIISOCYANATE-FATTY ACID TRIGLYCERIDE-POLYOL CELLULAR MATERIALS AND PROCESS OF PRODUCING SAME

Eric Barthel, Jr., New Castle, Del., assignor to E. I. du Pont de Nemours and Company, Wilmington, Del., a corporation of Delaware No Drawing. Application September 30, 1953
Serial No. 383,370

12 Claims. (Cl. 260—2.5)

This invention relates to cellular plastic materials and more particularly to cellular materials resulting from the reaction of water with polyurethane products formed from arylene diisocyanates and polyhydroxy compounds comprising fatty acid triglycerides. Still more particularly it relates to plastic foams of this type which exhibit only a small amount of shrinkage upon standing.

The preparation of cellular plastic products or plastic foams in which polyisocyanates are used as reactants has been described in "German Plastics Practice" by De Bell et al., 1946, pages 316 and 463–465. The cellular materials there described are prepared from the reaction of diisocyanates with alkyd resins which contain free hydroxyl and carboxyl groups. Somewhat similar plastic foams prepared from alkyd resins and diisocyanates are described in U. S. Patents 2,577,279, 2,597,025 and 2,602,783, of Simon et al.

An isocyanate plastic foam having improved resistance to being deformed or destroyed by compression, flexing or impact is described in U. S. Patent 2,787,601. This foam is obtained by reacting an excess of an arylene diisocyanate with a fatty acid triglyceride having a hydroxyl number of at least 49 to form an intermediate polyurethane product containing unreacted isocyanate groups, and thereafter foaming this product by reacting it with water. Reaction with water results in the formation of urea linkages and produces chain extension and cross-linking of the intermediate product with the formation of a more or less rigid structure, and also generates carbon dioxide which foams the resinous mass into the desired cellular plastic. U. S. Patent 2,787,601 discloses that the triglyceride and the diisocyanate are preferably used in such relative amounts that the ratio of triglyceride hydroxyl groups to isocyanate groups is from 0.45:2 to 0.95:2.

Although these products possess desirable physical properties and are well suited for many applications, it has been found that when the ratio of triglyceride hydroxyl groups to isocyanate groups is at the upper end of the range stated above, the resulting foams exhibit considerable shrinkage when used in making large articles or in filling cavities having large volumes.

Such shrinkage gives an undesired increase in density and may result in the cellular plastic material pulling away from its enclosing surfaces. The shape of articles made from the plastic foam may also be objectionably altered.

It is an object of this invention to provide cellular plastic materials made from diisocyanates and fatty acid triglycerides which display less shrinkage upon standing than do the products of this type previously known. A further object is the provision of such cellular products which possess, in addition to low shrinkage, other desirable physical properties. Further objects will appear from the detailed description of this invention which follows.

These objects are accomplished by the cellular plastic materials of this invention which comprise the reaction product of water with a polyurethane product formed by the reaction between an arylene diisocyanate, a fatty acid triglyceride having a hydroxl number of at least 49, and a compound containing a plurality of hydroxyl groups and having a molecular weight below about 200. These reagents are used in such relative amounts that the ratio of hydroxyl groups present in the low molecular weight polyhydroxy compound to triglyceride hydroxl groups is from 0.6:1 to 2.3:1, the ratio of the combined total number of hdroxyl groups present in the triglyceride and in the polyhydroxy compound to the number of isocyanate groups present in the arylene diisocyanate is from 0.65:2 to 1.1:2 and the amount of water used is at least approximately equivalent to the amount of unreacted isocyanate groups present in the said polyurethane product.

The fatty acid triglyceride may be either a naturally occurring oil such as castor oil or may be a blown drying oil of the type known in the trade as "heavy bodied" oils, such as blown linseed, tung, poppyseed, hempseed, soya oils and the like. The triglyceride should have a hydroxyl number of at least 49. If a triglyceride having too low a hydroxy number is used and if the prescribed ratio between hydroxyl groups and isocyanate groups is observed, the resulting reaction product will contain an insufficient number of unreacted isocyanate groups for the subsequent reaction with water and the final product will not be properly foamed or properly set. If additional diisocyanate is added to overcome this deficiency, a more brittle and less desirable cellular product is obtained. Triglycerides having hydroxyl numbers up to 180 may be used. This value is the hydroxyl number of the pure triglyceride of ricinoleic acid, and is not a limitation except from a practical standpoint. Naturally occurring oils with higher hydroxyl numbers are not known, and it is difficult to oxidize unsaturated oils to such an extent that the oxidation product has a hydroxyl number above 180.

The low molecular weight compound containing a plurality of hydroxyl groups which takes part in the reaction leading to the formation of the intermediate polyurethane product is ordinarily a diol or triol. The lower molecular weight hydroxy compounds and particularly those having molecular weights below about 200 are preferred. Among the compounds useful in this connection are polyhydroxy-substituted hydrocarbons having from about two to ten carbon atoms, such as ethylene glycol, propylene glycol, trimethylolpropane, the isomeric di- and trihydroxy butanes, and glycerin; polyhydroxy ethers, such as polyethylene or polypropylene glycols; and polyhydroxy thioethers such as thiodiethylene glycol.

As stated above, the relative amounts of the triglyceride and the other polyhydroxy compound should be such that the ratio of hydroxyl groups present in the low molecular weight polyhydroxy compound to triglyceride hydroxyl groups is from 0.6:1 to 2.3:1. When this hydroxyl group ratio is below about 0.6, no appreciable decrease in shrinkage is obtained, while with ratios above about 2.3:1, the resulting foams, although free from shrinkage, are brittle and have less desirable physical properties.

Any of a wide variety of arylene diisocyanates may be employed in the reaction, including such representative compounds as 2,4-tolylene diisocyanate, m-phenylene diisocyanate, 4-chloro-1,3-phenylene diisocyanate, 4,4'-biphenylene diisocyanate and 1,5-naphthylene diisocyanate. The term "arylene diisocyanates" is intended to refer to those compounds in which each of the two isocyanate groups is attached directly to an aromatic ring. It is not necessary that both isocyanate groups be attached to the same aromatic ring.

The arylene diisocyanate should be employed in such amount that the total number of hydroxyl groups in the triglyceride and the polyhydroxy compound is from 32.5 to 55% of the number of isocyanate groups in the diisocyanate. As smaller amounts of isocyanate are used, the resulting plastic foams become softer and more pliable and have undesirably low softening points. When too large an excess of diisocyanate is used, the resulting products are brittle, friable plastic foams which are lacking in abrasion resistance.

The reaction between the triglyceride, the low molecular weight polyhydroxy compound and the diisocyanate takes place readily with or without the application of external heat. By using the proportions of reagents shown above, an intermediate polyurethane product is obtained having a viscosity within the range of from about 750 to 75,000 centipoises at 30° C. At these viscosities the carbon dioxide which is evolved does not escape from the mass to any extent, and still the mass is capable of being properly blown into a cellular mass. If the viscosities are too low, the carbon dioxide would merely bubble out and escape, while at too high a viscosity satisfactory mixing cannot be obtained and non-uniform cellular products of higher density result.

The intermediate polyurethane product is converted to the ultimate cellular plastic material by mixing it with water, ordinarily in the presence of a tertiary amine catalyst. The reaction mass immediately begins to foam due to the reaction of the unreacted isocyanate groups with the water to form $CO_2$ and substituted ureas. If the foam is confined in a formed space, the foam will fill up that space and in a relatively short time will cure at room temperature to a firm, cellular plastic material that is resistant to damage by compression and displays little shrinkage upon standing. Enough water should be used to react with the unreacted isocyanate groups present in the intermediate polymer but there should not be a large excess. If too much water is used, the excess remains in the foam and acts as a plasticizer. If too little water is used, the unreacted isocyanate groups will tend to give instability and to produce excessive cross-linking and will result in brittle foams. Stated empirically, the amount of water used will ordinarily be between about 0.4 and 1.7 moles per mole of arylene diisocyanate used in preparing the intermediate polyurethane product.

A tertiary amine catalyst is preferably added with the water to form the cellular product. This catalyst may be omitted if longer reaction times or elevated temperatures are used. The tertiary amine catalyst is preferably of low volatility to avoid loss by evaporation and objectionable odor. Suitable compounds include triethylamine, diethylcyclohexylamine, dimethylhexadecylamine, dimethylcetylamine, triethanolamine, pyridine, quinoline and the like.

It is frequently desirable to use a dispersing agent in the water as it is mixed with the intermediate product. Usually from one-half percent to one percent of dispersing agent is sufficient; however, some of the higher molecular weight compounds hereinafter mentioned which assist in forming the dispersion also operate as modifiers of the resulting cellular plastic material, and therefore may be used in larger amounts. Among the dispersing agents which have been found to be satisfactory are: sodium carboxymethyl cellulose, lignin sulfonates, the lauric acid ester of triethanolamine, gelatine, and the diethyl cyclohexylamine salts of alkyl sulfates containing from 12 to 16 carbon atoms.

Instead of using only one each of the triglyceride, low molecular weight polyhydroxy compound and diisocyanate in the preparation of the plastic foams, mixtures of two or more compounds of any of these types may be used. Additives such as fillers, extenders, modifiers, etc., may also be incorporated into the material to give various effects to the sponge structure. Generally speaking these materials give more rigid, more brittle and more dense products. Consequently, when they are used they are added in minor amounts. Such products include magnesium carbonate, powdered wood cellulose, bentonite, silicon dioxide, calcium silicate, carbon black, glass fiber, magnesium stearate, methylene distearamide, etc. Magnesium stearate appears to cause somewhat larger cell structure and somewhat thicker cell walls.

The products of this invention and the methods of preparing them are illustrated by the following examples:

*Example 1*

One hundred seventy-four (174) parts of 2,4-tolylene diisocyanate are stirred into 157.5 parts of castor oil having a hydroxyl number of 160. An exothermic reaction begins at once and proceeds readily without the application of external heating or cooling. When the temperature of the reaction mass drops to room temperature, formation of the intermediate polyurethane product is essentially complete. To 33 parts of this polyurethane product is added a mixture of 3.06 parts of water and 0.89 part of diethylethanolamine catalyst. The mixture is stirred thoroughly with a mechanical stirrer or paddle for about 20 to 30 seconds and is quickly poured into a mold, four inches on a side, which is lined with polyethylene as a mold release agent. After from 3 to 5 minutes standing at room temperature, the $CO_2$ which is evolved foams the plastic to maximum volume. After standing a few more minutes, the plastic foam is thoroughly set and is removed from the mold.

Using the same general procedure, other cellular plastics are prepared using different proportions of 2,4-tolylene diisocyanate and castor oil, in some cases with added ethylene glycol. The proportions of ingredients in these products are as follows:

| Sample | Low M. W. Polyhydroxy Compound | Molar ratios | | |
|---|---|---|---|---|
| | | Total OH/diisocyanate | Glycol OH/triglyceride OH | Water/diisocyanate |
| A | none | 0.45:2.0 | | 1.7 |
| B | do | 0.81:2.0 | | 0.61 |
| C | ethylene glycol | 0.95:2.0 | 2.33 | 1.7 |
| D | do | 0.95:2.0 | 1.5 | 1.7 |
| E | do | 1.0:2.0 | 1.29 | 1.12 |
| F | do | 0.95:2.0 | 1.0 | 1.7 |

The physical properties of the resulting plastic foams are shown below. Shrinkage of the foams is measured on an arbitrary basis. The foams are cast into cubical form and are allowed to stand overnight. When shrinkage takes place, the centers of the faces of the cubes sink in toward the center, while the corners and edges of the cube are less affected. To measure shrinkage, the cube is cut in half at the points of maximum shrinkage, and the shortest distance across the cut face is measured. The percentage shrinkage as shown in the following table represents the percent by which this distance is less than the original length of a cube side.

| Sample | Rigidity | Cell Structure | Density, lbs./cu. ft. | Percent Shrinkage |
|---|---|---|---|---|
| A | | Poor | 1.64 | 3–6. |
| B | | Good | 4.30 | 60. |
| C | Brittle | Fair to good | | none. |
| D | Semi-rigid | Good | 2.71 | 6. |
| E | | Fair to good | 1.9 | slight. |
| F | | Good | 4.84 | 18. |

It will be observed from sample A that when large amounts of isocyanate are used, very little shrinkage results, but the cell structure is somewhat inferior. Sample B shows that with smaller amounts of isocyanate, a foam of good cell structure is obtained which, however, displays considerable shrinkage upon standing. When ethylene glycol is used to modify the foam as in C, the resulting foam does not shrink but is somewhat brittle because of the high amount of ethylene glycol used. As the ratio of glycol hydroxyl groups to triglyceride hydroxyl groups decreases, superior foams of good quality are obtained.

Example 2

Using the procedure described in Example 1, a control foam is prepared from castor oil, 2,4-tolylene diisocyanate and water in proportions such that the ratio of hydroxyl groups to isocyanate groups is 0.95:2, and the molar ratio of water to diisocyanate is 1.7:1. As in Example 1, diethylethanolamine is used as catalyst during the foaming step.

A second plastic foam is prepared by the same procedure but replacing part of the castor oil by a polyethylene glycol having a molecular weight of about 200. The proportions of total hydroxyl groups to isocyanate groups and of water to diisocyanate are the same as before. The ratio of glycol hydroxyl groups to castor oil hydroxyl groups is 1.5:1. The physical properties of the two foams are as follows:

|  | A | B |
| --- | --- | --- |
| Low M. W. polyhydroxy compound | none | polyethylene glycol. |
| Rigidity | Resilient | Resilient. |
| Cell structure | Good | Good. |
| Density, lbs./cu. ft | 3.84 | 2.19. |
| Shrinkage, percent | 25 | 15–18. |

Example 3

Using the same procedure as in Example 1, a polyurethane product is made from 105 parts of a heavy bodied linseed oil, 3 parts of glycerin, and 44 parts of 2,4-tolylene diisocyanate. Fifty (50) parts of the polyurethane product are then reacted with two parts of water and 0.87 part of diethylcyclohexylamine catalyst. The ratio of hydroxyl groups present in the linseed oil and in the glycerin to the number of isocyanate groups present in the tolylene diisocyanate is 0.76:2. The ratio of hydroxyl groups in the glycerin to the hydroxyl groups of the oil is 0.9:1. There are used 1.3 moles of water per mole of diisocyanate. The resulting foam is resilient, has a density of 3.3 pounds per cubic foot, a good cell structure and shows no shrinkage.

Example 4

A plastic foam is prepared by the procedure of Example 1, using 113 parts of a heavy bodied soya oil, 3 parts of glycerin and 44 parts of 2,4-tolylene diisocyanate. This corresponds to a ratio of hydroxyl groups to isocyanate groups of 0.76:2. The ratio of glycerin hydroxyl groups to soya oil hydroxyl groups is 0.9:1. The product is foamed by mixing 2 parts of water and 0.87 part of diethylcyclohexylamine with 50 parts of the intermediate polyurethane product. The resulting foam is resilient, has a density of 4.4 pounds per cubic foot, has a good cell structure and shows no shrinkage upon standing overnight.

Example 5

Using the procedure of Example 1, a cellular plastic foam is made using 71 parts of castor oil, 6 parts of glycerin and 79 parts of 2,4-tolylene diisocyanate. The ratio of hydroxyl groups in the castor oil and glycerin to the isocyanate groups present is 0.89:2. The ratio of glycerin hydroxyl groups to castor oil hydroxyl groups is 1:1. The intermediate polyurethane product is foamed by reacting 50 parts of it with 1.7 parts of water and 0.87 part of diethylcyclohexylamine catalyst. This corresponds to 0.65 mole of water per mole of diisocyanate used. The density of the resulting foam is 1.7 pounds per cubic foot. It has a good cell structure and shows very little shrinkage upon standing overnight.

Example 6

Using the procedure of Example 1, a plastic foam is made from 90 parts of castor oil, 10 parts of trimethylolpropane and 100 parts of 2,4-tolylene diisocyanate. The ratio of hydroxyl groups in the castor oil and trimethylolpropane to the isocyanate groups present is 0.84:2. The ratio of hydroxyl groups in the trimethylolpropane to the hydroxyl groups of the castor oil is 0.87:1. Fifty (50) parts of the intermediate polyurethane product are foamed by mixing in 2 parts of water and 0.89 part of diethylethanolamine catalyst. The amount of water used corresponds to 0.77 mole per mole of diisocyanate. The resulting plastic foam is semi-rigid but is not brittle, and has a good cell structure. Its density is 1.42 pounds per cubic foot and it shows 8% shrinkage upon standing overnight by the shrinkage test described in Example 1.

Example 7

Using the procedure of Example 1, a polyurethane product is made from 43.4 parts of castor oil, 4 parts of propylene glycol and 52.6 parts of 2,4-tolylene diisocyanate. This gives a ratio of hydroxyl groups to isocyanate groups of 0.754:2. The ratio of glycol hydroxy groups to castor oil hydroxy groups is 0.845:1. Fifty (50) parts of the intermediate polyurethane product are foamed by mixing in 2.2 parts of water and 0.89 part of diethylethanolamine catalyst. This amount of water corresponds to 0.807 mole per mole of diisocyanate. The resulting plastic foam is resilient and has good cell structure. Its density is 1.7 pounds per cubic foot and it shows 1.5% shrinkage.

Example 8

Using the procedure of Example 1, a polyurethane product is prepared from 37 parts of castor oil, 10.9 parts of dipropylene glycol and 52.1 parts of 2,4-tolylene diisocyanate. The ratio of hydroxyl groups to isocyanate groups is 0.898:2, and the ratio of glycol hydroxy groups to castor oil hydroxy groups is 1.54:1. Fifty (50) parts of this intermediate polyurethane product are mixed with 1.91 parts of water and 0.89 part of diethylethanolamine. This corresponds to 0.71 mole of water per mole of diisocyanate. The resulting plastic foam is fairly resilient and has very good cell structure. Its density is 1.5 pounds per cubic foot and it shows 2% shrinkage upon standing overnight.

Example 9

Using the procedure of Example 1, a polyurethane product is formed from 44 parts of castor oil, 5.3 parts of thiodiethylene glycol (sold by Carbide and Carbon Chemicals Co. as "Kromfax"), and 50.7 parts of 2,4-tolylene diisocyanate. This gives a ratio of hydroxyl groups to isocyanate groups of 0.73:2. The ratio of glycol hydroxy groups to castor oil hydroxy groups is 0.69:1. A foam is prepared by mixing 50 parts of this intermediate polyurethane product with 1.65 parts of water and 0.89 part of diethylethanolamine catalyst. The resulting cellular plastic material is resilient and has very good cell structure. Its density is 1.7 pounds per cubic foot and it displays 7% shrinkage upon standing overnight.

The plastic foams of this invention are useful insulating materials and are of particular value where large volumes of material are to be used, as where large voids are to be filled or where the foam is to be precast into large blocks or other shapes. They retain the desirable resilience, flexibility and resistance to impact of the plastic foams described in U. S. Patent 2,787,601, and in addition show substantially less shrinkage when used in large volume units than do the prior art foams.

What is claimed is:

1. A cellular plastic material comprising the reaction product of water with a polyurethane product formed by the reaction between (a) an arylene diisocyanate, (b) a fatty acid triglyceride having a hydroxyl number of at least 49 and selected from the group consisting of castor oil and blown drying oils, and (c) a polyhydroxy compound from the class consisting of saturated diols and triols and having a molecular weight below about 200, the reagents being used in such relative amounts that the ratio of hydroxyl groups present in the low molecular weight polyhydroxy compound to triglyceride hydroxyl groups is from 0.6:1 to 2.3:1, the ratio of the combined total number of hydroxyl groups present in the triglyceride and in the polyhydroxy compound to the number of isocyanate groups present in the arylene diisocyanate is from 0.65:2 to 1.1:2, and the amount of water used is from about 0.4 to 1.7 moles per mole of arylene diisocyanate used in the preparation of said polyurethane product.

2. A cellular plastic material according to claim 1 in which the low molecular weight polyhydroxy compound is ethylene glycol.

3. A cellular plastic material according to claim 1 in which the low molecular weight polyhydroxy compound is glycerin.

4. A cellular plastic material according to claim 1 in which the fatty acid triglyceride is castor oil.

5. A cellular plastic material according to claim 1 in which the fatty acid triglyceride is a blown drying oil having a hydroxyl number of at least 49.

6. A fluid polyurethane product comprising the reaction product of (a) an arylene diisocyanate, (b) a fatty acid triglyceride having a hydroxyl number of at least 49 and selected from the group consisting of castor oil and blown drying oils, and (c) a polyhydroxy compound from the class consisting of saturated diols and triols and having a molecular weight below about 200, the reagents being used in such relative amounts that the ratio of hydroxyl groups present in the low molecular weight polyhydroxy compound to triglyceride hydroxyl groups is from 0.6:1 to 2.3:1, and the ratio of the combined total number of hydroxyl groups present in the triglyceride and in the polyhydroxy compound to the number of isocyanate groups present in the arylene diisocyanate is from 0.65:2 to 1.1:2.

7. A polyurethane product according to claim 6 in which the low molecular weight polyhydroxy compound is ethylene glycol.

8. A polyurethane product according to claim 6 in which the low molecular weight polyhydroxy compound is glycerin.

9. A polyurethane product according to claim 6 in which the fatty acid triglyceride is castor oil.

10. A polyurethane product according to claim 6 in which the fatty acid triglyceride is a blown drying oil having a hydroxyl number of at least 49.

11. A method of preparing a cellular plastic material which comprises reacting together to form a polyurethane product (a) an arylene diisocyanate, (b) a fatty acid triglyceride having a hydroxyl number of at least 49 and selected from the group consisting of castor oil and blown drying oils, and (c) a polyhydroxy compound from the class consisting of saturated diols and triols and having a molecular weight below about 200, the reagents being used in such relative amounts that the ratio of hydroxyl groups present in the low molecular weight polyhydroxy compound to triglyceride hydroxyl groups is from 0.6:1 to 2.3:1 and the ratio of the combined total number of hydroxyl groups present in the triglyceride and in the polyhydroxy compound to the number of isocyanate groups present in the arylene diisocyanate is from 0.65:2 to 1.1:2; and thereafter reacting the said polyurethane product with an amount of water which is from about 0.4 to 1.7 moles per mole of arylene diisocyanate used in the preparation of said polyurethane product.

12. In the preparation of cellular plastic materials, the step which comprises reacting together to form a polyurethane product (a) an arylene diisocyanate, (b) a fatty acid triglyceride having a hydroxyl number of at least 49 and selected from the group consisting of castor oil and blown drying oils, and (c) a polyhydroxy compound from the class consisting of saturated diols and triols and having a molecular weight below about 200, the reagents being used in such relative amounts that the ratio of hydroxyl groups present in the low molecular weight polyhydroxy compound to triglyceride hydroxyl groups is from 0.6:1 to 2.3:1 and the ratio of the combined total number of hydroxyl groups present in the triglyceride and in the polyhydroxy compound to the number of isocyanate groups present in the arylene diisocyanate is from 0.65:2 to 1.1:2.

References Cited in the file of this patent

UNITED STATES PATENTS

| | | |
|---|---|---|
| 2,577,279 | Simon et al. | Dec. 4, 1951 |
| 2,602,783 | Simon et al. | July 8, 1952 |
| 2,621,166 | Schmidt et al. | Dec. 9, 1952 |
| 2,650,212 | Windemuth | Aug. 25, 1953 |
| 2,787,601 | Detrick et al. | Apr. 2, 1957 |

OTHER REFERENCES

Chemical Engineering, April 1950, volume 57, No. 4, pages 165–166.